United States Patent [19]

Hauser, Jr.

[11] Patent Number: 4,525,131
[45] Date of Patent: Jun. 25, 1985

[54] CABLE-COATING EXTRUDER HEAD SYSTEM WITH CHANGEABLE DIE AND GUIDER ELEMENTS

[75] Inventor: Henry W. Hauser, Jr., Antes Fort, Pa.

[73] Assignee: Alcan Aluminum Corporation, Cleveland, Ohio

[21] Appl. No.: 526,962

[22] Filed: Aug. 29, 1983

[51] Int. Cl.³ .............................................. B29C 30/14
[52] U.S. Cl. .................................... 425/114; 264/174; 425/113; 425/190; 425/192 R
[58] Field of Search ........... 425/113, 114, 190, 192 R; 264/174

[56] References Cited

U.S. PATENT DOCUMENTS

| | | | |
|---|---|---|---|
| 793,895 | 7/1905 | Monroe | 425/113 |
| 893,939 | 4/1908 | Royle | 425/191 |
| 1,859,901 | 5/1932 | Trebes | 425/191 |
| 2,185,701 | 1/1940 | Boyle | 425/113 |
| 2,199,209 | 4/1940 | Safford | 425/113 |
| 3,111,712 | 11/1963 | Frate | 425/113 |
| 3,323,171 | 6/1967 | Hannis | 425/114 |
| 3,402,427 | 9/1968 | Christofas et al. | 264/174 |
| 3,538,547 | 11/1970 | Drabb | 425/113 |
| 3,581,343 | 6/1971 | Henrikson et al. | 425/192 R |
| 3,752,614 | 8/1973 | Bremer | 425/113 |
| 3,856,446 | 12/1974 | Schultz | 425/185 |
| 4,081,232 | 3/1978 | Pemberton et al. | 425/192 R |
| 4,303,734 | 12/1981 | Sullivan | 425/192 R |

FOREIGN PATENT DOCUMENTS

1946415 4/1971 Fed. Rep. of Germany ...... 425/191
1010864 7/1974 Japan .................................... 425/113

Primary Examiner—Jeffery Thurlow
Assistant Examiner—Patrick Dailey
Attorney, Agent, or Firm—Cooper, Dunham, Clark, Griffin & Moran

[57] ABSTRACT

A cable-coating extruder head having a head body with a central passageway for an advancing cable, a die insert removably seated in a fixed die body at the forward end of the passageway providing a die aperture through which the cable passes, and a guider insert removably mounted in a fixed guider body within the passageway for centering the cable in the die aperture, wherein both the guide insert and the die insert are insertable forwardly and removable rearwardly through the rearward end of the passageway to enable change of guider and die apertures without displacing the forward end of the head body. The guider insert has a rearward extension projecting beyond the head body for manipulation to facilitate guider insert removal and replacement. After a guider insert is removed, a shank having a threaded front projection is inserted forwardly into the passageway until the projection extends through and beyond the die aperture, a nut is threaded over the projection to secure the die insert to the shank, and the shank is withdrawn rearwardly to remove the die insert; this procedure is reversed, again using the shank and nut, to mount another die insert in the die body, before another guider insert is mounted in the guider body.

11 Claims, 4 Drawing Figures

CABLE-COATING EXTRUDER HEAD SYSTEM WITH CHANGEABLE DIE AND GUIDER ELEMENTS

BACKGROUND OF THE INVENTION

This invention relates to cable-coating extruder heads having die and guider assemblies with replaceable aperture-defining elements for accommodating different sizes of cable and/or producing different coating thicknesses, as well as to devices and procedures for changing these elements in such heads. As used herein, the term "cable" refers both to single-strand wire and to multistrand cable.

In present-day commercial practice, to provide electrical conductor cable with an insulating or like coating, the cable to be coated is continuously advanced longitudinally through a central passageway in an extruder head and through a die aperture at the forward end thereof while heated molten or otherwise fluent polymeric coating material (e.g. polyethylene containing a filler, a cross-linking agent, and/or other additives) is forced into and through the head by an extruder screw so as to come into coating contact with the advancing cable. Thus, the cable emerging through the die aperture carries a layer of the coating material, having a thickness determined by the clearance between the die and cable. A guider within the central passageway centers the cable in the die aperture as required for uniformity of coating thickness. Beyond the head, the coated cable typically passes through a steam chamber or other zone providing appropriate conditions for curing the applied coating. Detailed reference will be made herein to such production of insulating coatings on conductor cable, as constituting one important and illustrative specific use of the invention.

Specifically, the present invention relates to improvements in the broadly known type of extruder head, for coating a longitudinally advancing cable with a layer of fluent coating material, which comprises an extruder head body having a rearward end, a forward end, a central passageway extending between the ends and arranged for substantially axial advance of the cable therethrough, and a lateral passageway for delivering the coating material under pressure to the central passageway from a locality (e.g. a screw extruder barrel) outside the head body; a die extending across the central passageway at the forward end of the head body and defining a die aperture disposed and dimensioned for advance of the cable with clearance therethrough from the central passageway; and guider means mounted within the central passageway rearwardly of the die for centering the cable in the die aperture, the guider means having an annular lip for closely surrounding the cable adjacent the die and cooperating with the die to define an annular gap around the cable, the guider means further cooperating with the head body to define a passage for conducting the coating material from the lateral passageway through the gap into contact with the cable to apply thereto a coating material layer having a thickness determined by the clearance between the die and the cable. It will be understood that terms such as "front" and "forwardly," and "rear" and "rearwardly," are used herein with reference to the direction of cable advance; i.e. the rearward end of the extruder head body is the end at which the uncoated cable enters the central passageway, and the forward end is the end at which the coated cable emerges therefrom.

Advantageously, the same extruder apparatus is used at different times to coat cable of various different gauges and to produce coatings of various different thicknesses. When it is desired to change the gauge of cable being coated and/or to change the thickness of the applied coating, it is necessary to change the guider and/or the die so as to provide an appropriately dimensioned die aperture and guider lip for the new cable gauge and/or coating thickness. That is to say, since the guider lip must conform very closely to the cable diameter for accurate centering of the cable in the die aperture, and since the die-cable clearance determines coating thickness, production of a coating of a given thickness on a cable of given gauge requires use of a specific die and guider combination different from that required for any other gauge and coating thickness. In conventional extruder heads of the type described above, such changes have heretofore necessitated partial disassembly of the head body, viz. removal of the forward end of the head body, with attendant difficulties and inconveniences.

Thus, it has been conventional to provide the head body with a removable forward end portion, bolted to the central portion of the head body, and carrying the aperture-defining die element in a die holder which is in turn mounted and centered in the forward end portion of the head body by plural adjusting screws. The lip-bearing guider element has been threadedly secured in a central passageway in such manner as to be removable only through the front end of the passageway, i.e. after the forward end portion of the head body is dismounted. Change of die and guider elements therefore involves the successive steps of removing the forward end portion of the head body (thereby opening the front end of the central passageway); extracting the die element; unscrewing and withdrawing the guider element forwardly; inserting a new guider element; placing a new die element in the die holder; remounting the forward end portion of the head body, with the new die; and, finally, manipulating the adjusting screws to center the new die aperture properly relative to the guider lip. While the front end of the central passageway is open during this changing operation, fluent coating material bleeds out of the head, because the coating material must continue to flow in order to prevent the material from setting up in the extruder apparatus; this bleedout is wasteful of coating material, and also requires more or less extensive cleaning up of the equipment and work area. The centering screw adjustment is difficult and time-consuming, and tends to result in production of scrap (unevenly coated cable) at the start of the new run until proper centering is achieved. Overall, the down time required for each change of die and guider elements has typically exceeded one and one-half hours, with resultant impairment of desired productivity and efficiency of operation.

SUMMARY OF THE INVENTION

The present invention broadly contemplates the provision of extruder head apparatus, of the above-described type, wherein the guider means includes a generally annular guider body fixedly mounted in the central passageway of the head body and having an internal opening constituting the narrowest constriction within the central passageway rearwardly of the die, and a guider insert including the annular lip, removably received in and detachably engaged by the guider body and extractable and insertable through the rearward end of the head body, the guider insert having an extension which projects rearwardly beyond the rearward end of the head body so as to be manipulable for disengaging and extracting the guider insert; and wherein the female die includes a die body, fixedly mounted in the head body at the forward end thereof, defining a die seat in register with the internal opening of the guider body, and a die insert removably received in the die seat and defining the die aperture, the die insert and die seat being mutually shaped to permit rearward removal of the die insert from the die seat and forward insertion of the die insert into the die seat while preventing forward displacement of the die insert beyond the die seat, the die insert having a maximum external transverse dimension sufficiently small to enable the die insert to pass through the internal opening of the guider body such that the die insert is extractable and insertable through the rearward end of the head body when the guider insert is extracted from the guider body.

That is to say, in the apparatus of the invention the guider means is provided in two parts, a fixed guider body and a removable guider insert, of which the part bearing the annular lip (the guider insert) is extractable from and insertable into the central passageway of the head body through the rearward end thereof; and the die is likewise provided in two parts, a fixed die body and a removable die insert, of which the part defining the die aperture (the die insert) is also extractable and removable through the rearward end of the head body, being dimensioned to pass through the fixed annular guider body in the central passageway when the guider insert is removed. Thus, the guider lip and die aperture can be changed (e.g. for a change in gauge of cable being coated) without removing or displacing the forward end of the extruder body; as a result, bleedout of coating material during the changing operation is minimized, extensive recentering of the die is avoided, there is no need for disassembly of the head body, and the overall changing operation is advantageously simpler and more expeditious than has heretofore been possible with conventional extruder heads. These features and advantages can readily be provided by retrofitting modification of a conventional extruder head, viz. by replacing the guider means and die of such head with appropriately dimensioned two-part guider means and die elements in accordance with the invention. In such case, though the forward end of the head body could still be displaced, for removal of the die body and guider body through that end, there is no need to do so; the die body and guider body instead remain fixedly mounted, during a changing operation, while the guider insert and die insert are removed and replaced through the rearward end of the head body.

Conveniently or preferably, the guider body and guider insert are concentrically disposed tubular elements bearing mating threaded portions, for interengagement, adjacent the forward end of the head body, the cable passing through the interior of the guider insert within the central passageway of the head body. Also, conveniently or preferably, the die insert is a circular, centrally apertured disc with an outside diameter smaller than the minimum inside diameter of the guider insert, and having a forwardly beveled edge that is received in a correspondingly beveled edge of the die seat to retain the die insert against forward displacement beyond the die seat, in which the die insert is press-fitted and held by friction. A complete extruder head system in accordance with the invention includes a plurality of interchangeable guider inserts respectively having annular lips of different sizes (to accommodate cables of different gauges) but otherwise identical in external configurations and dimensions so as to be mountable in the same guider body, and a plurality of interchangeable die inserts respectively having die apertures of different sizes but identical outside configurations and dimensions so as to be receivable in the same die seat.

Removal of the guider insert through the rearward end of the extruder head body is facilitated by the aforementioned provision of an extension for the insert, which projects through the rearward end of the head body so that it can be manipulated (e.g. turned to unscrew the guider insert from the guider body, and then pulled to withdraw the guider insert) when the guider insert is in place in the guider body. For removing and replacing the die insert, the invention further contemplates the provision of a die-changing tool comprising a shank, insertable through the rearward end of the head body into the guider body when no guider insert is present in the guider body, having a front end bearing an externally threaded axial projection dimensioned to extend forwardly through the die aperture of a die insert in the die seat when the shank is fully inserted in the guider body and the shank front end abuts the rearward face of the last-mentioned die insert, the shank having a length sufficient to protrude rearwardly beyond the rearward end of the head body, so as to be manually graspable, when fully inserted as aforesaid; and a nut, threadable on the shank projection when the projection extends through the last-mentioned die insert for securing the die insert between the nut and the shank front end, the nut having a maximum outside transverse dimension smaller than the minimum inside transverse dimension of the die seat (and smaller than the minimum inside transverse dimension of the internal opening of the guider body) so that the die-changing tool, after initial full insertion of the shank as aforesaid and threading of the nut on the projection, can be withdrawn rearwardly through the central passageway of the head body thereby to remove from the head body a die insert secured between the nut and the shank.

Procedure in accordance with the invention for changing a die aperture and guider lip in the extruder head of the invention, using the above-described die-changing tool, includes the successive steps of removing a first guider insert from the head body by disengaging the insert from the guider body and extracting the insert rearwardly; inserting the shank of the die-changing tool into the central passageway through the rearward end of the head body until the front end projection of the shank extends through and beyond a first die insert positioned in the die seat; threading the nut on the projection to secure the first die insert to the shank; withdrawing the shank, bearing the first die insert and the nut, rearwardly through the central passageway; removing the first die insert from the shank and mounting thereon a second die insert, held by the nut; inserting the shank (carrying the second die insert) forwardly into the central passageway through the rearward end of the head body, until the second die insert is received in the die seat; releasing the latter die insert from the nut and shank, and withdrawing the shank rearwardly from the head body; and, finally, introducing a second guider insert through the rearward end of the head body and securing it in the guider body.

Further features and advantages of the invention will be apparent from the detailed description hereinbelow set forth, together with the accompanying drawings.

DETAILED DESCRIPTION

Figure 1:
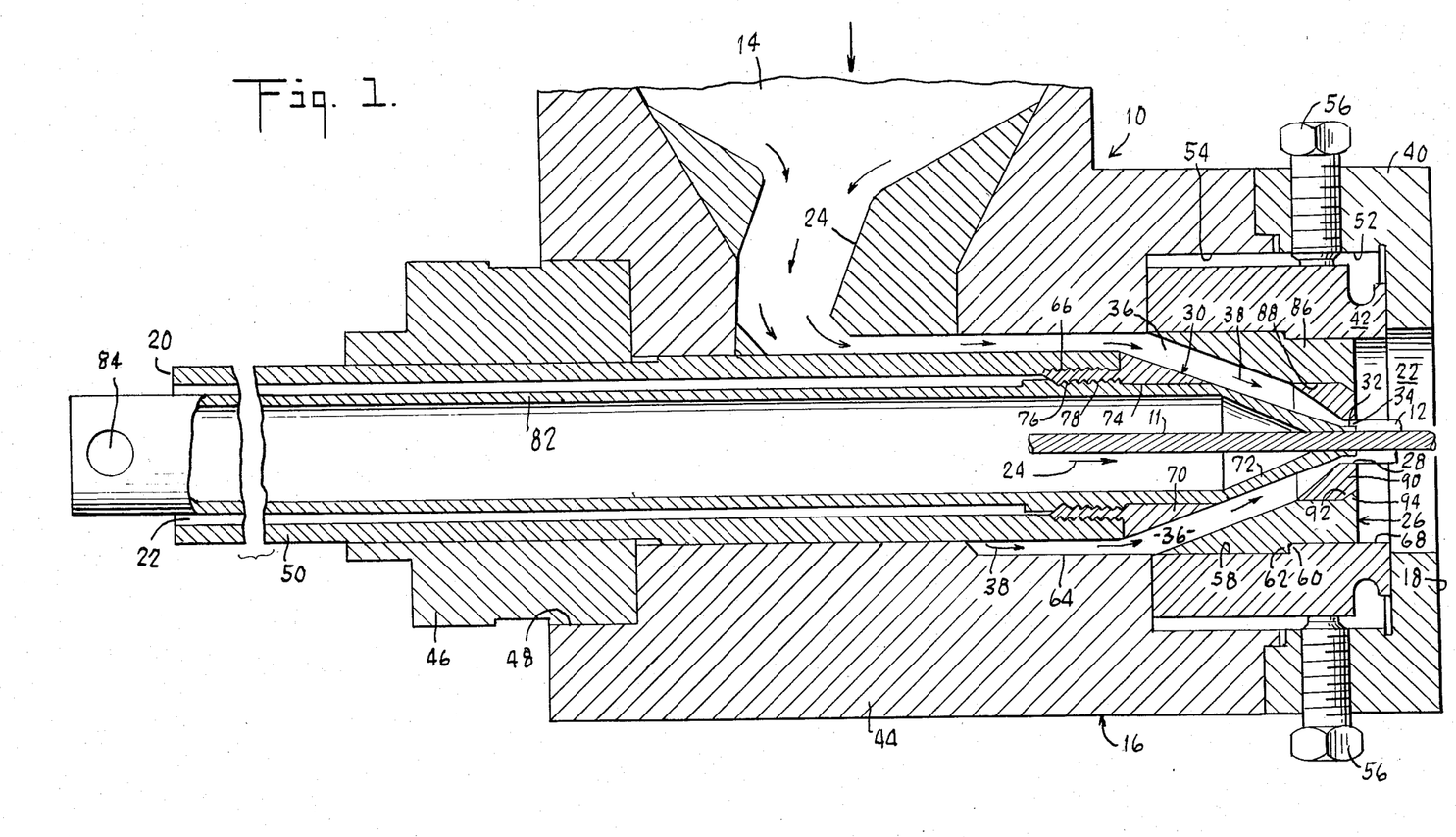
FIG. 1 is a sectional side elevational view of an extruder head embodying the present invention in a particular form.

Referring first to FIG. 1, the apparatus of the invention is illustrated as embodied in an extruder head 10 for coating the surface of a continuously longitudinally advancing multistrand electrical conductor cable 11 of substantially circular cross-section with a continuous, substantially uniform layer 12 of a polymeric insulating coating material which is applied to the cable in a molten or otherwise fluent condition and subsequently cured (as by passing the coated cable, beyond the head 10, through a steam chamber or other curing zone, not shown) to produce a permanent insulating coating on the cable. The coating material, in heated, fluent condition, is forced under pressure into and through the head 10 by a conventional screw-type extruder (also not shown), the outlet end of which discharges into the head through a port 14 in the head. The details of this-type of coating procedure, including the composition of the coating material, the construction and operation of the screw-type extruder, the provision and operation of suitable equipment for continuously advancing the cable along a substantially rectilinear (e.g. horizontal) path through and beyond the head 10, and the arrangement and conditions of the curing zone, may all be entirely conventional, and as such are well known to persons skilled in the cable-coating art.

The extruder head apparatus of FIG. 1 includes a rigid extruder head body generally designated 16, having a forward end 18, a rearward end 20, an axially rectilinear central passageway 22 extending through both ends, and a lateral passageway 24 for delivering the fluent coating material from the port 14 to the central passageway. The cable 11 to be coated advances longitudinally through the central passageway 22 (which is generally circular in cross-section throughout its length), along a rectilinear path substantially aligned with the axis of passageway 22, in the direction indicated by arrow 24, entering the passageway 22 at the rearward end 20 and exiting from the passageway at the forward end 18 of the head body.

The apparatus of FIG. 1 further includes a die, generally designated 26, extending across the central passageway 22 and defining a circular die aperture 28 through which the cable 11 passes with clearance as the cable advances from the central passageway. The aperture 28 is positioned in alignment with the cable path through the central passageway 22 and has a diameter selected, with reference to the diameter of the cable being coated, to provide desired clearance between the cable and the aperture-defining edge of the die.

Guider structure, generally designated 30, is mounted within the central passageway rearwardly of the die for centering the cable in the die aperture. This guider structure has an annular lip 32 for closely surrounding the cable adjacent the die aperture and cooperating with the die to define an annular gap 34 around the cable. The guider structure 30 further cooperates with the head body 16 to define a passage 36 (of generally annular cross-section, surrounding the guider structure) for conducting the coating material from the lateral passageway 24, as indicated by arrows 38, through the annular gap 34 and into contact with the cable surface, to apply to the cable a layer of the coating material having a thickness determined by the aforementioned clearance between the cable and the die.

In the embodiment of FIG. 1, the extruder head body 16 is of wholly conventional construction as heretofore employed in cable-coating extruders, and comprises a generally annular forward end block 40, a generally annular die holder 42 carried by the forward end block, a central block 44, a rear block 46 seated in a recess 48 in the rear end of the central block, and an open-ended guider tube 50 mounted within the central block and the rear block and projecting for some distance rearwardly of the rear block. For present purposes, the die holder and guider tube will be considered as elements of the head body rather than as elements of the die and guider structure, respectively. As will be appreciated, the showing of the head body in FIG. 1 is to some extent fragmentary, for convenience of illustration; i.e. the top of the central block has been omitted, and as indicated, the guider tube has been shortened.

The forward end block 40 is secured to the front end of the central block 44 in conventional manner by a plurality of bolts (not shown) so as to be separable from the central block and removable (to the right, as seen in FIG. 1) to open the front end of the central passageway. The die holder 42, received in facing recesses 52 and 54 of the forward end block and the central block, is secured in the forward end block (again conventionally) by a plurality of adjusting screws 56 disposed radially around the forward end block; these screws can be turned to adjust the centering of the die holder. The die 26 is received in a central bore 58 of the die holder having a rearwardly facing annular ledge 60 against which a corresponding peripheral annular ledge 62 of the die abuts to prevent forward displacement of the die by the forwardly directed fluid pressure of the coating material.

The central and rear blocks are hollow, defining open-ended, coaxial, generally cylindrical central passages through which the guider tube 50 extends, coaxially therewith. The forward portion of the central passage of the central block is enlarged as shown at 64 so as to be spaced outwardly of the outer surface of the forward portion of the guider tube and to define therewith an annular continuation of the lateral passageway 24 leading to the passage 36. The front end of the guider tube is internally threaded at 66 to engage an external thread on the rear portion of the guider structure 30, thereby to mount the guider structure in the central passageway. It will be seen that the central passageway 22, in its rearward portions, is defined by the guider tube 50, and forwardly thereof is constituted by the forward part of the central block passage enlargement 64, by the die holder bore 58, and by the central opening 68 of the forward end block; the lateral passageway 24 thus joins the central passageway 22 at the forward end of the guider tube 50, where the coating material enters the annular passage 36 defined by the guider structure within the central passageway as explained above.

In this extruder head, if the die 26 were a conventional one-piece die, change of the die aperture would require disassembly of the forward end block 40 (with the die holder and die) from the remainder of the head body, thereby opening the front end of the central passageway 22, followed by removal of the die from the die holder 42, insertion of a new die (having a different die aperture) into the holder, and remounting of the forward end block on the central block 44, after which careful adjustment of the screws 56 would ordinarily be necessary to achieve proper centering of the new die. In addition, if the guider structure 30 were a conventional one-piece guider, it could be removed (for replacement with a different guider having a different-sized annular lip 32) only by unscrewing and extraction through the front end of the central passageway, i.e. after the forward end block, with the die holder and die, have been detached and removed from the central block.

In accordance with the present invention, however, the guider structure 30 in the embodiment of FIG. 1 comprises two concentrically disposed tubular components or elements: a guider body 70, threadedly mounted in the front end of the guide tube 50 as described above, and a guider insert 72, disposed within the guider body 70 and bearing the annular lip 32. For the purposes of the invention, the guider body is considered to be fixedly mounted in the central passageway 22, because it is not displaced or removed incident to change of guider lip and/or die aperture; it is of generally annular configuration, defining an open-ended cylindrical internal opening 74 which constitutes the narrowest constriction encountered in the central passageway 22 rearwardly of the die, i.e. when the guider insert 72 is removed. In a rearward portion of opening 74 (but still adjacent the forward end of the head body), the guider body 70 is formed with an internal thread 76, for engaging an external thread 78 formed on a cylindrical portion of the outer surface of the guider insert 72. A stop ridge on the guider insert 72 behind the thread 78 limits movement of the insert 72 relative to body 70 in a forward direction.

The guider insert is removably received in the guider body (i.e. within opening 74) and detachably secured therein by the engagement of threads 76 and 78. As shown, the guider insert 72 terminates forwardly in a frusto-conical portion tapering to the lip 32, and the outer surface of the forward portion of the guider body is also frusto-conical and forwardly tapering. When the guider insert is fully received in the guider body (viz. in the position shown in FIG. 1), with its thread 78 engaging the guider body thread 76 to secure the insert in the guider body, a cylindrical outer surface portion of the insert 72 forwardly of the threads fits snugly within opening 74, and the frustoconical outer surfaces of the guider body and guider insert conform to provide an effectively continuous surface constituting the inner wall of the passage 36.

At all points ahead of the thread 78, the diameter of the guider insert is smaller than the diameter of the guider body opening 74; and at every point throughout its length, the guider insert is smaller in diameter than the central passageway 22 rearwardly of the opening 74. Consequently, the guider body is extractable and insertable through the rearward end 20 of the head body. To enable such extraction and insertion, the guider insert includes, as an integral portion thereof, a cylindrical, tubular, open-ended extension 82 (also smaller in diameter than the central passageway 22 rearwardly of the opening 74) projecting rearwardly from the ridge 80 through the central passageway and beyond the rearward end 20 of the head body (i.e. when the guider insert is fully received in the guider body) for manipulation to disengage and extract the guider insert. A hole 84 is formed in the exposed rear end portion of the extension 82, into which a rod can be fitted to facilitate rotation of the extension and insert 72 for engaging or disengaging the threads 76 and 78. With the guider insert in place, the path of advance of the cable 11 extends through the open rear end of the extension 82, through the interior of the extension and guider insert within the passageway 22, and thence through the lip 32 and the die aperture 28.

Further in accordance with the invention, the die 26 in the embodiment of FIG. 1 also comprises two elements or components: a generally annular die body 86, mounted in the die holder bore 58, defining a circular die seat 88 disposed forwardly of and in register with the internal opening 74 of the guider body 70, and a circular, disc-shaped female die insert 90, removably received in the die seat 88 and defining the die aperture 28. The die insert and die seat are mutually shaped to permit rearward removal of the die insert from the die seat and forward insertion of the die insert into the die seat while preventing forward displacement of the die insert beyond the die seat (i.e. under the influence of the forwardly directed fluid pressure of the fluent coating material); specifically, in this embodiment, the die insert has a forwardly beveled edge 92 which engages a conformingly internally beveled edge 94 of the die seat, the die insert being press-fitted and held by friction in the die seat. The die body 86, for purposes of the present invention, is fixedly mounted in the die holder portion of the central passageway 22 because this die body is not displaced or removed incident to change of die aperture.

As a particular feature of the invention, the maximum outside diameter of the die insert 90 is smaller than the minimum inside diameter of the internal opening 74 of the guider body 70, so that, when the die insert is displaced rearwardly from the die seat, the die insert can pass through the guider body opening 74 (after extraction of the guider insert 72) and, like the guider insert, can be withdrawn from the central passageway of the extruder head body through the rearward end 20, thus avoiding removal of the forward end block 40. Similarly, a new die insert as well as a new guider insert can be successively installed through the rearward end of the head body, and advanced forwardly into their respective operating positions through the central passageway, without displacing or removing the forward end block. The means and method employed for effecting such removal and replacement of the die insert, in accordance with further features of the invention, will be described in detail below.

Although only a single die insert and a single guider insert are illustrated, it will be understood that a complete extruder head system in accordance with the invention includes a plurality of guider inserts 72 differing from each other only in respect of lip size (viz. to accommodate different cable gauges), and a plurality of die inserts 90 differing from each other only in respect of die aperture diameter. Thus, the plural die inserts, being identical in outside configuration and outside diameter, are interchangeably insertable in the same die seat 88, while the plural guider inserts, being identical in configuration and dimensions rearwardly of the lip 32, are likewise interchangeably mountable in the same guider body 70.

Figure 2:
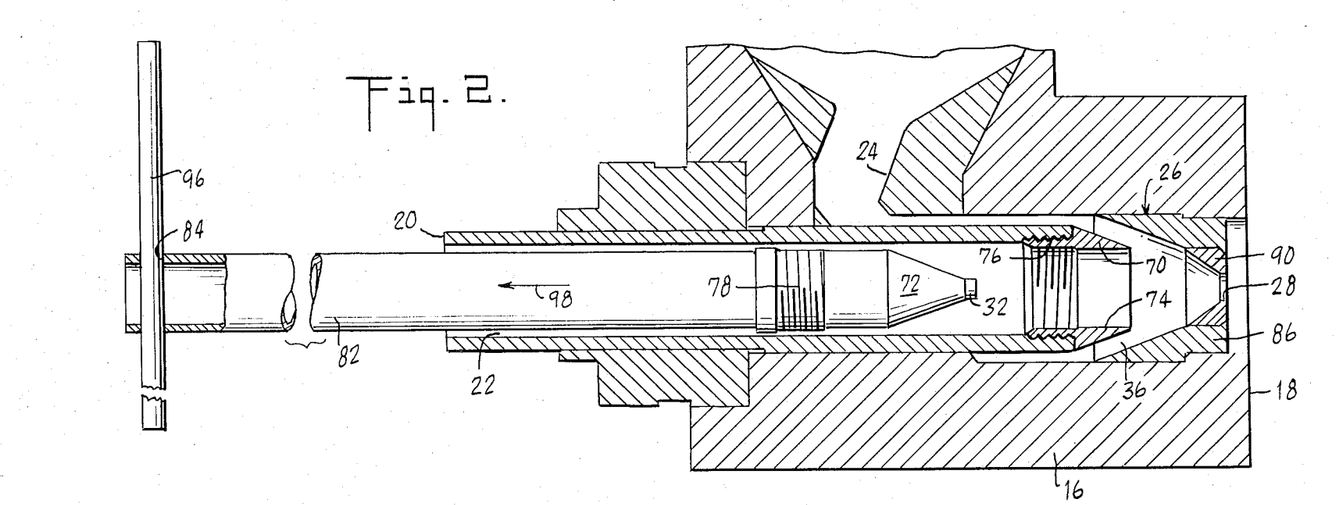
FIGS. 2, 3 and 4 are similar sectional views, somewhat simplified, illustrating successive steps in changing guider and die inserts in the extruder head of FIG. 1, in accordance with the method of the invention, and utilizing an embodiment (shown in FIGS. 3 and 4) of the die-changing tool of the invention.
Figure 3:
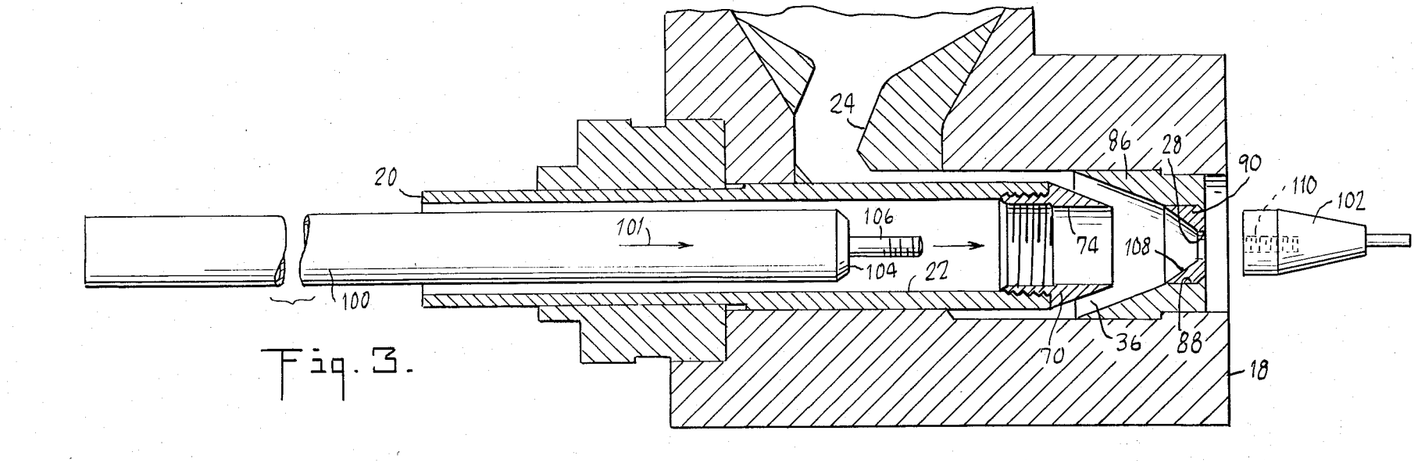
Figure 4:
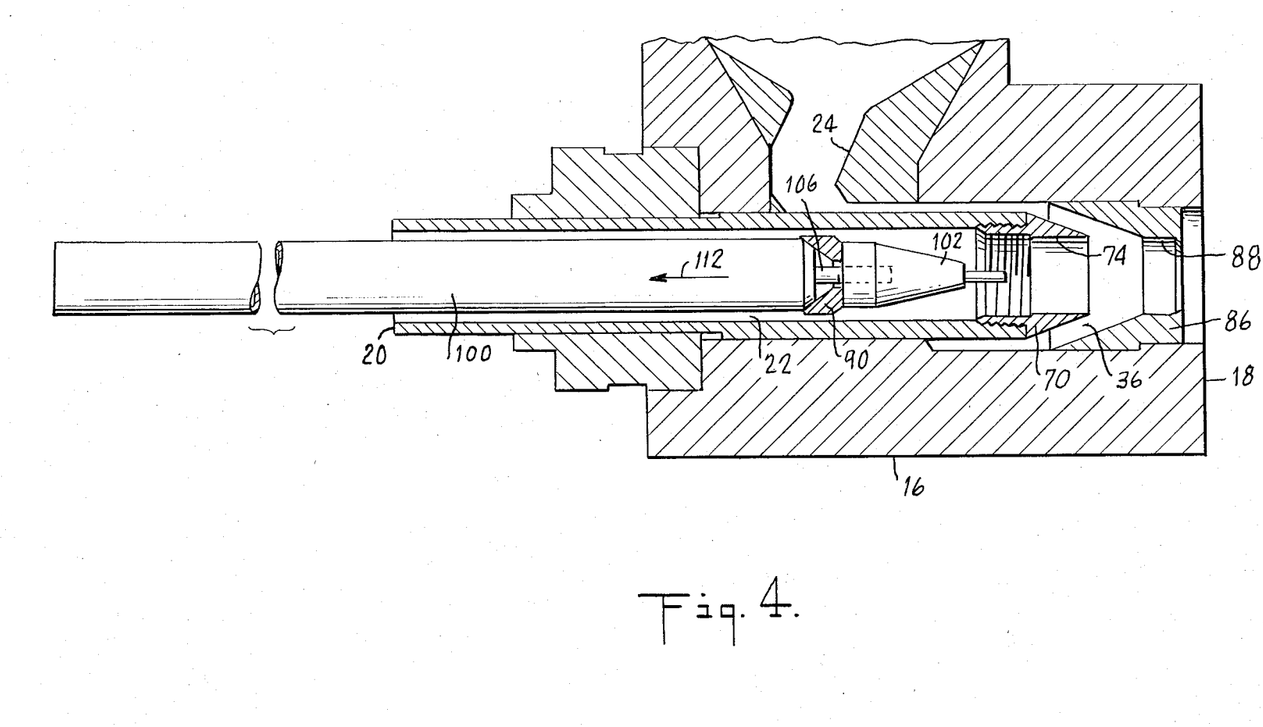

The apparatus of FIG. 1 has been illustrated and described as incorporating an extruder head body of known construction for the purpose of showing that the present invention can be embodied in an otherwise conventional extruder head by relatively facile retrofitting modification, i.e. by substituting, for the conventional one-piece guider structure and one-piece die, the two-component (body and insert) devices having the configurations and relative dimensions set forth above. The invention, however, enables considerable simplification of the head body construction if desired, since change of die aperture and guider lip does not require disassembly of the front end of the head body as has heretofore been necessary. In FIGS. 2-4, the front end of the head body is shown in a greatly simplified form, in part for convenience of illustration, but the apparatus of FIGS. 2-4 is in all other respects essentially identical to that of FIG. 1.

Referring, then, to FIGS. 2-4, there are shown successive stages in the removal of the guider and die inserts, after a cable being coated has run out of the extruder head and in preparation for coating another cable e.g. of different gauge. Initially, in this sequence of steps, a rod 96 is inserted in the hole 84 in the guider insert extension 82 (FIG. 2); the rod, extending transversely of the extension, enables the guider insert to be rotated manually about its axis so as to disengage its thread 78 from the thread 76 of the guider body 70. The guider insert 72 is then withdrawn manually (by means of the extension 82) rearwardly through the passageway 22, i.e. to the left in FIG. 2 as indicated by arrow 98, until it is completely extracted through the rearward end 20 of the head body 16. With the guider insert thus clear of the head body, the narrowest constriction in the passageway 22 rearwardly of the die 26 is the internal opening 74 of the guider body 70.

To remove the die insert 90 in accordance with the invention, after the guider insert has been removed, there is employed a die-changing tool, an embodiment of which is illustrated in FIGS. 3 and 4. This tool comprises a cylindrical shank 100, dimensioned to be insertable, through the rearward end 20 of the head body, forwardly (to the right in FIG. 3, arrow 101) into the passageway 22 and through the guider body opening 74 when no guider insert is present in the guider body; and a cap nut 102. The shank 100 has a front end 104 bearing an externally threaded axial projection 106 dimensioned to extend forwardly through and beyond the die aperture 28 of a die insert 90 received in the die seat 88 when the shank is fully inserted through the guider body and the shank front end abuts the rearward face 108 of the die insert. The shank has a length sufficient to protrude rearwardly beyond the rearward end 20 of the head body, so as to be manually graspable, when thus fully inserted. Preferably, the shank diameter is fairly large (in relation to the diameter of the opening 74 through which it passes) to facilitate alignment of the projection 106 with the die aperture.

The nut 102 has an internally threaded bore 110 for threadedly engaging the projection 106, when the projection extends through the aperture 28 of a die insert 90, to secure the die insert between the nut and the front end of the shank. The maximum outside diameter of the nut is smaller than the minimum inside diameter of the die seat 88 (and also smaller than the minimum inside diameter of the guider body opening 74) so that after the projection 106 has been inserted through the aperture of a die insert positioned in the die seat 88 and the nut has been threaded on the projection 106, the die-changing tool, including the nut and carrying the latter die insert, can be withdrawn rearwardly through the passageway 22 (to the left in FIG. 4, arrow 112) and through the rearward end 20 of the head body, for extracting the removal die insert rearwardly through end 20.

In use, then, after the guider insert 72 has been removed (FIG. 2), the shank 100 is inserted forwardly into the passageway 22 through the rearward end of the head body (arrow 101, FIG. 3) until its projection 106 extends through and beyond the aperture of the die insert 90 in die seat 88. The nut is threaded onto the projection 106, and the shank and nut with the latter die insert secured between them are withdrawn rearwardly (arrow 112, FIG. 4) through the passageway 22 and through and beyond the rearward end 20 of the head body, extracting the die insert from the extruder head.

Nut 102 is thereafter unscrewed to remove the extruded die insert from the projection 106, and a new die insert with a die aperture of different size is fitted over the projection 106 and secured thereto by the nut. The shank 100, carrying the new die insert and the nut, is reintroduced into the passageway 22 through the rearward end 20 and advanced forwardly until the new die insert is fully received in the die seat 88; the thus-mounted new die insert is released, and left in place for use in coating the new cable, by removing the nut 102 and withdrawing the shank 100 again rearwardly out of the passageway 22. A new guider insert 72 (e.g. with a different lip size) is then inserted forwardly into the passageway 22 through the rearward end 20 until it is received in the guider body, and is rotated by means of rod 96 to engage its thread 78 with the guider body thread 76 so as to secure the guider insert in the guider body. Finally, the rod 96 is removed from the hole 84, and a new cable to be coated is led through the interior of the extension 80, guider insert 72, lip 32, and die aperture 28 in preparation for resumed coating operation.

As will be apparent from the foregoing description, the entire procedure of removing and replacing the guider insert and die insert is performed through the rearward end of the head body, without displacing or removing the forward end portion of the head body. Consequently, bleedout of coating material, cleanup requirements, and recentering of the die (with attendant scrap losses) are advantageously minimized, as compared with the guider and die changing procedures that must be employed in conventional extruder head equipment, and overall changing time is very beneficially reduced. Additional advantages of the invention include simplification of manipulative operations and equipment design.

It is to be understood that the invention is not limited to the features and embodiments hereinabove specifically set forth, but may be carried out in other ways without departure from its spirit.

I claim:

1. Extruder head apparatus for coating a longitudinally advancing cable with a layer of a fluent coating material, comprising (a) an extruder head body having a rearward end, a forward end, a central passageway extending between the ends and arranged for substantially axial advance of the cable therethrough, and a lateral passageway for delivering the coating material under pressure to the central passageway from a locality outside the head body;

(b) a die extending across the central passageway at said forward end and defining a die aperture disposed and dimensioned for advance of the cable with clearance therethrough from the central passageway; and (c) guider means mounted within the central passageway rearwardly of the die for centering the cable in the die aperture, said guider means having an annular lip for closely surrounding the cable adjacent the die and cooperating with the die to define an annular gap around the cable, said guider means further cooperating with the head body to define a passage for conducting the coating material from the lateral passageway through the gap into contact with the cable to apply thereto a coating material layer having a thickness determined by the clearance between the die and the cable;

(d) said guider means including (i) a generally annular guider body fixedly mounted in said central passageway, extending forwardly of said lateral passageway, and having an internal opening constituting the narrowest constriction within the central passageway rearwardly of the die, and (ii) a guider insert including said lip, removably received in and detachably engaged by said guider body and extractable and insertable through said rearward end, said guider insert further including an extension projecting rearwardly beyond said rearward end when the guider insert is received in said guider body as aforesaid for manipulation to disengage and extract the guider insert, the guider body and the guider insert being mutually arranged to permit advance of the cable through the central passageway; and (e) said die including (i) a die body fixedly mounted in said head body at said forward end, defining a die seat in register with said internal opening, and (ii) a female die insert removably received in said die seat and defining said die aperture, said die insert and said die seat being mutually shaped to permit rearward removal of the die insert from the die seat and forward insertion of the die insert into the die seat while preventing forward displacement of the die insert beyond the die seat, said die insert having a maximum external transverse dimension sufficiently small to enable the die insert to pass through said internal opening such that the die insert is extractable and insertable through said rearward end when said guider insert is extracted from said guider body.

2. Apparatus as defined in claim 1, wherein said guider body has an inner surface, and said guider insert has an outer surface, respectively bearing means interengageable and disengageable by rotation of said guider insert for removably securing said guider insert to said guider body, said guider insert being rotatable by manipulation of said extension.

3. Apparatus as defined in claim 2, wherein said interengageable means are screw threads and are disposed, rearwardly of said die, adjacent said forward end.

4. Apparatus as defined in claim 3, wherein said guider body comprises a first generally tubular element, and wherein said guider insert comprises a second generally tubular element disposed concentrically within said guider body and having a frusto-conical forward portion terminating in said lip, said extension constituting a rearward portion of said second tubular element and said second tubular element being arranged for advance of the cable therethrough within said central passageway.

5. Apparatus as defined in claim 4, wherein said guider body comprises a hollow, open-ended, frusto-conical element mounted adjacent said forward end, defining said internal opening and bearing internal screw threads.

6. Apparatus as defined in claim 1, wherein said internal opening is circular, and wherein said die insert has a circular periphery smaller in diameter than said internal opening.

7. Apparatus as defined in claim 1, wherein said die insert has a circular, forwardly beveled outer edge, and wherein said die seat has a correspondingly beveled circular edge.

8. An extruder head system for coating a longitudinally advancing cable with a layer of a fluent coating material, selectively capable of coating cable of respectively different diameters and applying layers of respectively different thicknesses, said system comprising (a) an extruder head body having a rearward end, a forward end, a central passageway extending between the ends and arranged for substantially axial advance of the cable therethrough, and a lateral passageway for delivering the coating material under pressure to the central passageway from a locality outside the head body;

(b) a die extending across the central passageway at said forward end for providing a die aperture disposed and dimensioned for advance of the cable with clearance therethrough from the central passageway; and (c) guider means mounted within the central passageway rearwardly of the die for centering the cable in the die aperture, said guider means providing an annular lip for closely surrounding the cable adjacent the die and cooperating with the die to define an annular gap around the cable, said guider means further cooperating with the head body to define a passage for conducting the coating material from the lateral passageway through the gap into contact with the cable to apply thereto a coating material layer having a thickness determined by the clearance between the die and the cable;

(d) said guider means including (i) a generally annular guider body fixedly mounted in said central passageway, extending forwardly of said lateral passageway, and having an internal opening constituting the narrowest constriction within the central passageway rearwardly of the die; and (ii) a plurality of guider inserts each including an annular lip as aforesaid, each removably receivable in and detachably engageable by said guider body and extractable and insertable through said rearward end, each said guider insert further including an extension projecting rearwardly beyond said rearward end when the guider insert is received in said guider body as aforesaid for manipulation to disengage and extract the guider insert, the guide body and the guider insert being mutually arranged to permit advance of the cable through the central passageway, said plurality of guider inserts respectively having lips of different dimensions for accommodating cables of different diameters, and all said guider inserts being identical in configuration and external dimensions rearwardly of the lip so as to be interchangeably receivable in said guider body; and (e) said die including
(i) a die body, fixedly mounted in said head body at said forward end, defining a die seat in register with said internal opening, and
(ii) a plurality of female die inserts each removably receivable in said die seat and each defining a die aperture as aforesaid, each said die insert and said die seat being mutually shaped to permit rearward removal of the die insert from the die seat and forward insertion of the die insert into the die seat while preventing forward displacement of the die insert beyond the die seat, each said die insert having a maximum external transverse dimension sufficiently small to enable the die insert to pass through said internal opening such that the die insert is extractable and insertable through said rearward end when no guider insert is present in said guider body, said plurality of die inserts respectively defining die apertures of different diameters, and all said die inserts being identical in external configuration and dimensions so as to be interchangeably receivable in said die seat.

9. A system as defined in claim 8, wherein said guider body is a first tubular element having an internally threaded portion adjacent said forward end, each of said guider inserts is a second tubular element insertable concentrically in said first tubular element and having an externally threaded portion positioned and arranged for engagement with said internally threaded portion to secure the guider insert detachably in the guider body, wherein each said die insert is a circular member having an outside diameter smaller than the inside diameter of said internal opening and a forwardly beveled edge, and wherein said die seat is a circular opening having a correspondingly beveled edge.

10. An extruder head system for coating a longitudinally advancing cable with a layer of a fluent coating material, selectively capable of coating cable of respectively different diameters and applying layers of respectively different thicknesses, said system comprising
(a) an extruder head body having a rearward end, a forward end, a central passageway extending between the ends and arranged for substantially axial advance of the cable therethrough, and a lateral passageway for delivering the coating material under pressure to the central passageway from a locality outside the head body;
(b) a die extending across the central passageway at said forward end for providing a die aperture disposed and dimensioned for advance of the cable with clearance therethrough from the central passageway; and
(c) guider means mounted within the central passageway rearwardly of the die for centering the cable in the die aperture, said guider means providing an annular lip for closely surrounding the cable adjacent the die and cooperating with the die to define an annular gap around the cable, said guider means further cooperating with the head body to define a passage for conducting the coating material from the lateral passageway through the gap into contact with the cable to apply thereto a coating material layer having a thickness determined by the clearance between the die and the cable;

(d) said guider means including
(i) a generally annular guider body fixedly mounted in said central passageway, extending forwardly of said lateral passageway, and having an internal opening constituting the narrowest constriction within the central passageway rearwardly of the die; and
(ii) a plurality of guider inserts each including an annular lip as aforesaid, each removably receivable in and detachably engageable by said guider body and extractable and insertable through said rearward end, each said guider insert further including an extension projecting rearwardly beyond said rearward end when the guider insert is received in said guider body as aforesaid for manipulation to disengage and extract the guider insert, the guider body and the guider insert being mutually arranged to permit advance of the cable through the central passageway, said plurality of guider inserts respectively having lips of different dimensions for accommodating cables of different diameters, and all said guider inserts being identical in configuration and external dimensions rearwardly of the lip so as to be interchangeably receivable in said guider body; and (e) said die including
(i) a die body, fixedly mounted in said head body at said forward end, defining a die seat in register with said internal opening, and
(ii) a plurality of female die inserts each removably receivable in said die seat and each defining a die aperture as aforesaid, each said die insert and said die seat being mutually shaped to permit rearward removal of the die insert from the die seat and forward insertion of the die insert into the die seat while preventing forward displacement of the die insert beyond the die seat, each said die insert having a maximum external transverse dimension sufficiently small to enable the die insert to pass through said internal opening such that the die insert is extractable and insertable through said rearward end when no guider insert is present in said guider body, said plurality of die inserts respectively defining die apertures of different diameters, and all said die inserts being identical in external configuration and dimensions so as to be interchangeably receivable in said die seat, each said die insert being insertable and removable by a die-changing tool.

11. A system as defined in claim 10, wherein said die-changing tool comprises
(i) a shank, insertable through said rearward end into said guider body when no guider insert is present in said guider body, having a front end bearing an externally threaded axial projection dimensioned to extend forwardly through the die aperture of a die insert received in said die seat when the shank is fully inserted through the guider body and the shank front end abuts the rearward face of the last-mentioned die insert, said shank having a length sufficient to protrude rearwardly beyond said rearward end, so as to be manually graspable, when fully inserted as aforesaid, and
(ii) a nut, threadable on said projection when said projection extends through the last-mentioned die insert for securing the last-mentioned die insert between the nut and the shank front end, said nut having a maximum outside transverse dimension smaller than the minimum inside transverse dimension of the die seat and smaller than the minimum inside transverse dimension of said internal opening so that said die-changing tool, after initial full insertion of the shank as aforesaid and threading of the nut on the projection, can be withdrawn rearwardly through the central passageway thereby to remove from the head body a die insert secured between the nut and the shank.

* * * * *